US009352913B2

(12) United States Patent
Manuszak et al.

(10) Patent No.: US 9,352,913 B2
(45) Date of Patent: May 31, 2016

(54) INNERSPRING MANUFACTURING AND ASSEMBLY SYSTEM AND COMPONENTS FOR SELECTABLE COIL ORIENTATION, POSITION ADJUSTMENT AND COIL CONVEYANCE

(71) Applicant: Sealy Technology LLC, Trinity, NC (US)

(72) Inventors: Brian M. Manuszak, Thomasville, NC (US); Mark J. Reisz, Demotte, IN (US); Wayne E. Douglas, Rensselear, IN (US)

(73) Assignee: Sealy Technology, LLC, Trinity, NC (US)

( * ) Notice: Subject to any disclaimer, the term of this patent is extended or adjusted under 35 U.S.C. 154(b) by 0 days.

(21) Appl. No.: 14/409,727

(22) PCT Filed: Mar. 14, 2014

(86) PCT No.: PCT/US2014/028377
§ 371 (c)(1),
(2) Date: Dec. 19, 2014

(87) PCT Pub. No.: WO2014/152953
PCT Pub. Date: Sep. 25, 2014

(65) Prior Publication Data
US 2015/0196949 A1 Jul. 16, 2015

Related U.S. Application Data

(60) Provisional application No. 61/784,196, filed on Mar. 14, 2013.

(51) Int. Cl.
B65G 47/24 (2006.01)
B21F 33/02 (2006.01)
B65G 15/14 (2006.01)

(52) U.S. Cl.
CPC .............. *B65G 47/24* (2013.01); *B21F 33/025* (2013.01); *B65G 15/14* (2013.01); *Y10T 29/5187* (2015.01)

(58) Field of Classification Search
CPC ...... B65G 15/14; B65G 47/24; B65G 47/252; B21F 23/00; B21F 33/00; B21F 33/025; Y10T 29/5187
USPC .................. 198/412, 399, 379, 383, 608, 624
See application file for complete search history.

(56) References Cited

U.S. PATENT DOCUMENTS 2,614,681 A * 10/1952 Keil .......................... B65C 9/04
156/DIG. 26
3,690,456 A * 9/1972 Powers, Jr. ......... G01N 21/9009
198/379

(Continued)

FOREIGN PATENT DOCUMENTS

WO 96-27461 A1 9/1996
WO 99-50175 A1 10/1999

*Primary Examiner* — Leslie A Nicholson, III
*Assistant Examiner* — Keith R Campbell

(57) ABSTRACT

Innerspring assembly manufacturing machinery includes a coil forming machine for forming individual wire form coils from a supply of wire, a geneva to transfer individual coils from the coil forming machine to a coil conveyor, a coil orientation device to change a radial orientation of a coil about a longitudinal axis of the coil in the coil conveyor, and an innerspring assembler for receiving a coil from the conveyor in an orientation determined by the coil orientation device. The coil orientation device includes first and second pairs of rollers mounted for linear translation toward and away from a coil conveyor and into contact with a coil in contact with the coil conveyor. The first or second pair of rollers are driven to rotate while in contact with the coil in contact with the conveyor to rotate the coil about a longitudinal axis of the coil.

11 Claims, 15 Drawing Sheets

(56) References Cited

U.S. PATENT DOCUMENTS

| | | | | |
|---|---|---|---|---|
| 3,722,657 A | * | 3/1973 | Kienle | B65G 47/2445 198/394 |
| 3,938,653 A | * | 2/1976 | Senger | B65G 47/2445 198/379 |
| 4,164,281 A | * | 8/1979 | Schnier | B65G 47/244 198/394 |
| 4,257,151 A | * | 3/1981 | Coots | B23P 19/06 198/379 |
| 4,533,033 A | * | 8/1985 | van Wegen | B65B 13/183 100/14 |
| 5,127,509 A | * | 7/1992 | Kohlen | B65H 67/086 198/345.3 |
| 6,155,310 A | | 12/2000 | Haubert et al. | |
| 6,430,982 B2 | | 8/2002 | Andrea et al. | |
| 6,659,261 B2 | * | 12/2003 | Miyakawa | B23Q 3/183 198/345.1 |
| 6,776,279 B2 | * | 8/2004 | Krull | B65G 47/24 198/626.1 |
| 8,157,084 B2 | * | 4/2012 | Begin | B65G 47/244 198/376 |
| 8,783,447 B1 | * | 7/2014 | Yohe | B65G 21/2054 198/626.5 |
| 9,085,420 B2 | * | 7/2015 | Williams | B65G 47/244 |
| 2002/0139645 A1 | | 10/2002 | Haubert et al. | |
| 2004/0079780 A1 | * | 4/2004 | Kato | 226/24 |
| 2014/0291116 A1 | * | 10/2014 | Williams | B65G 47/244 198/379 |

* cited by examiner

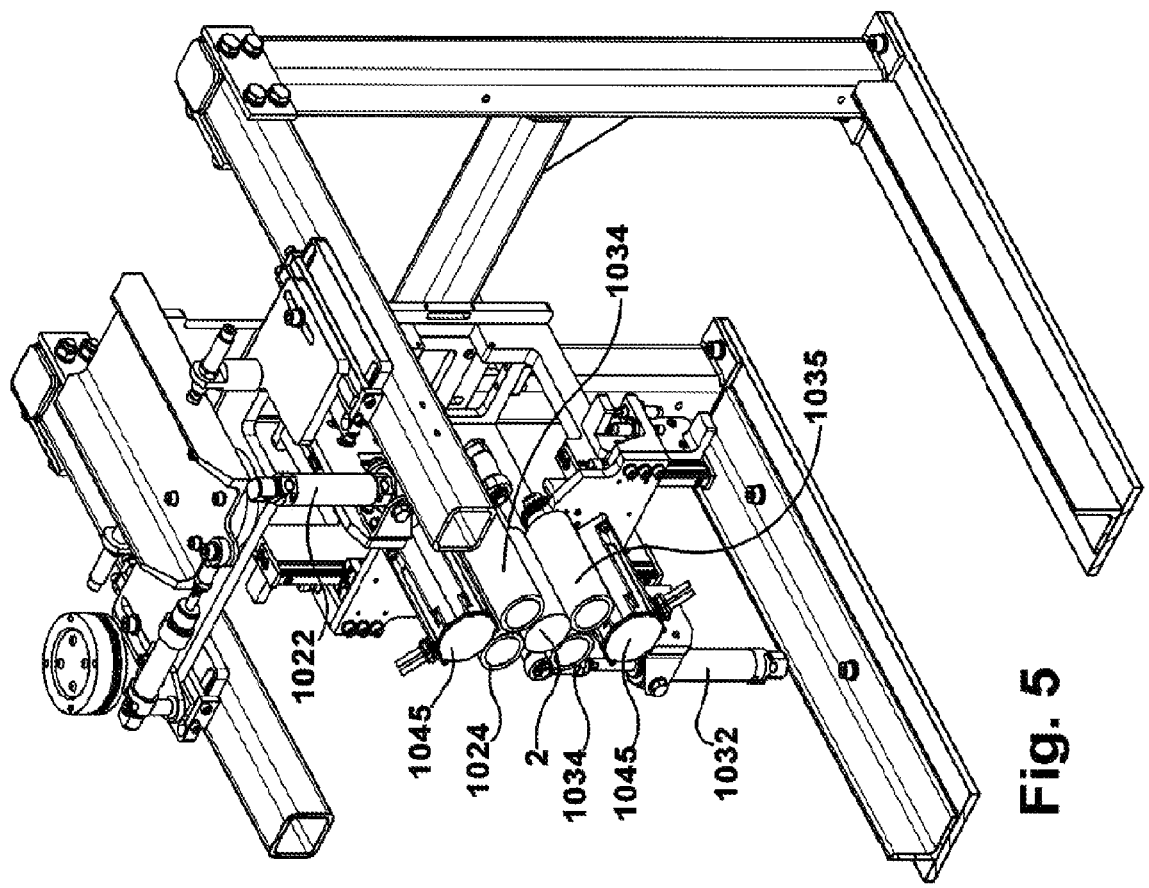
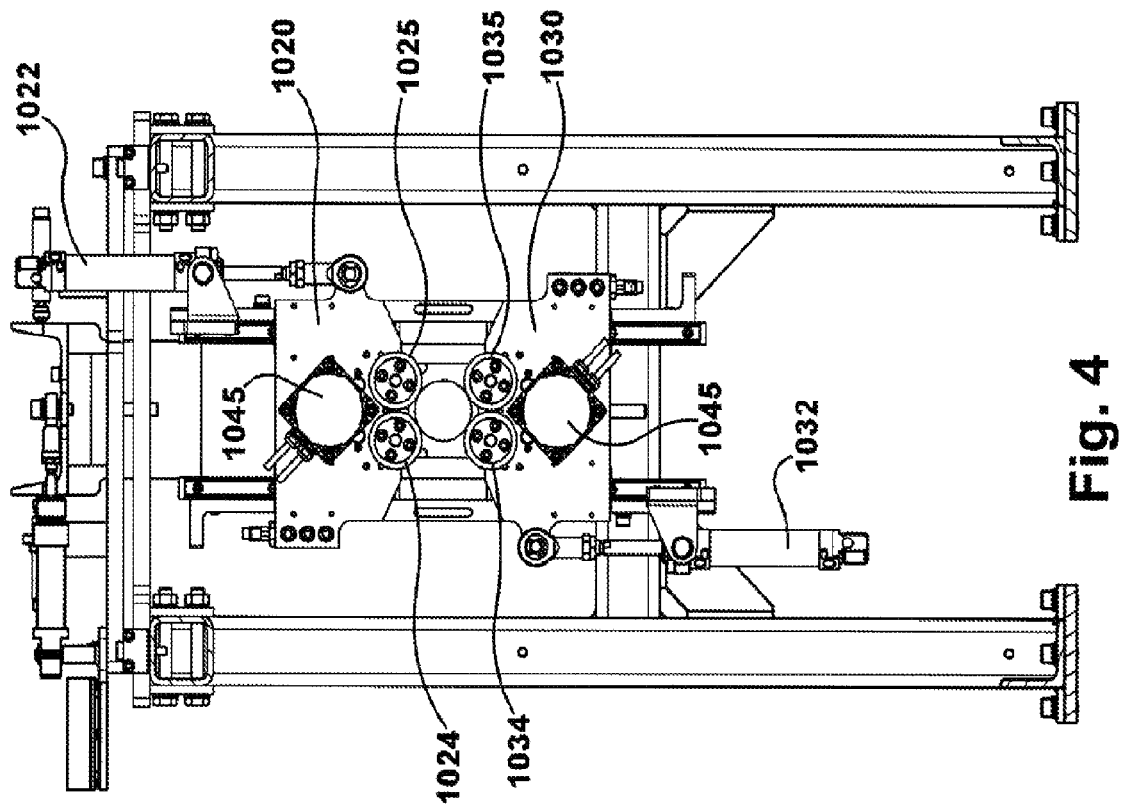
Fig. 5
Fig. 4

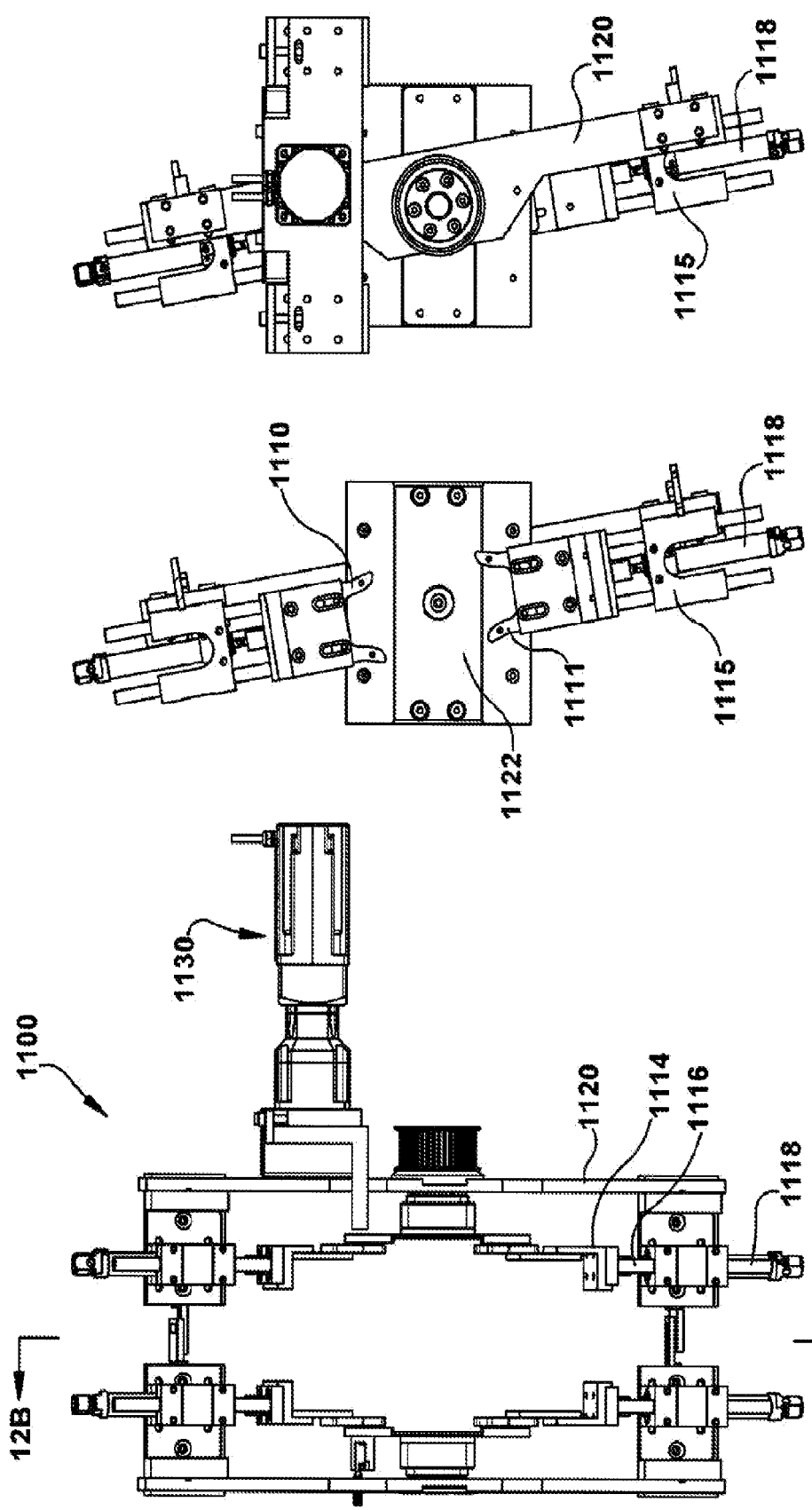

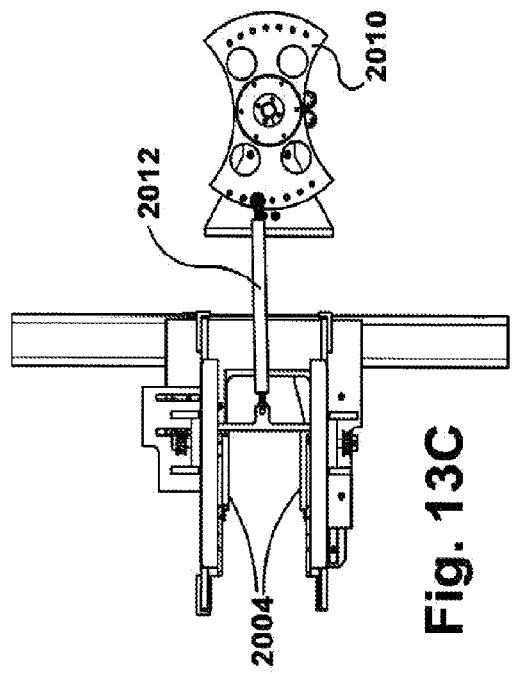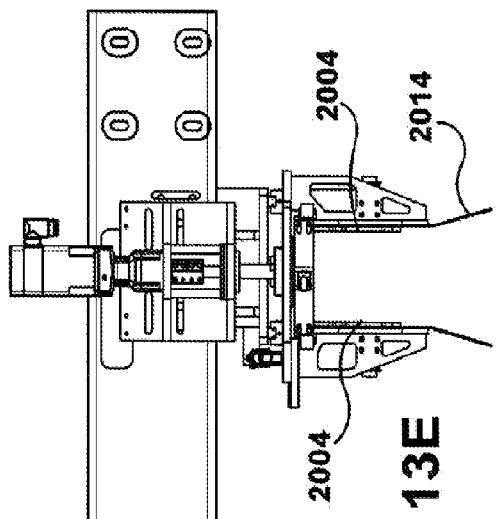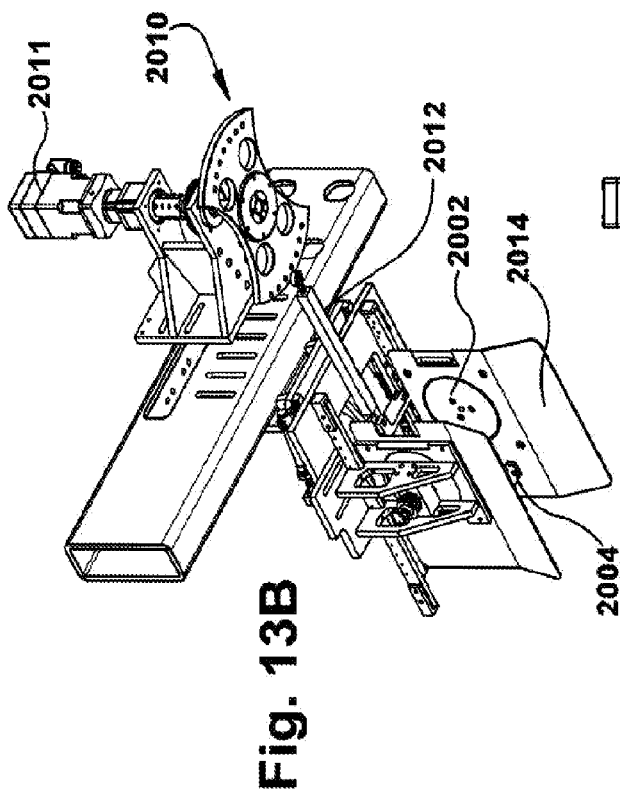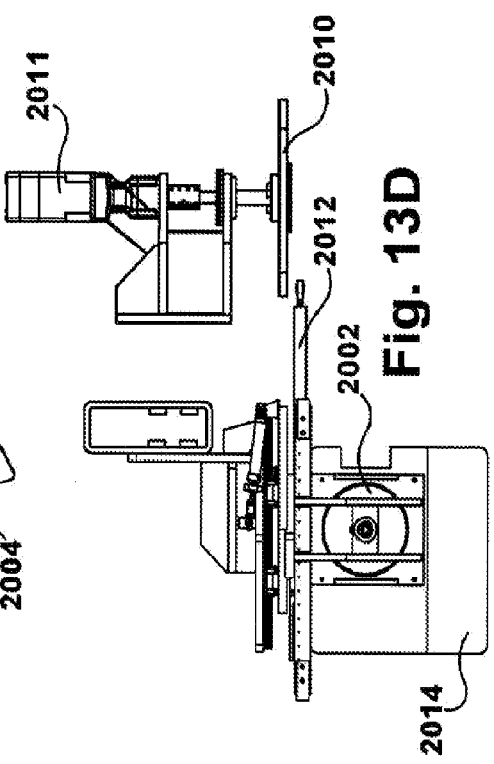

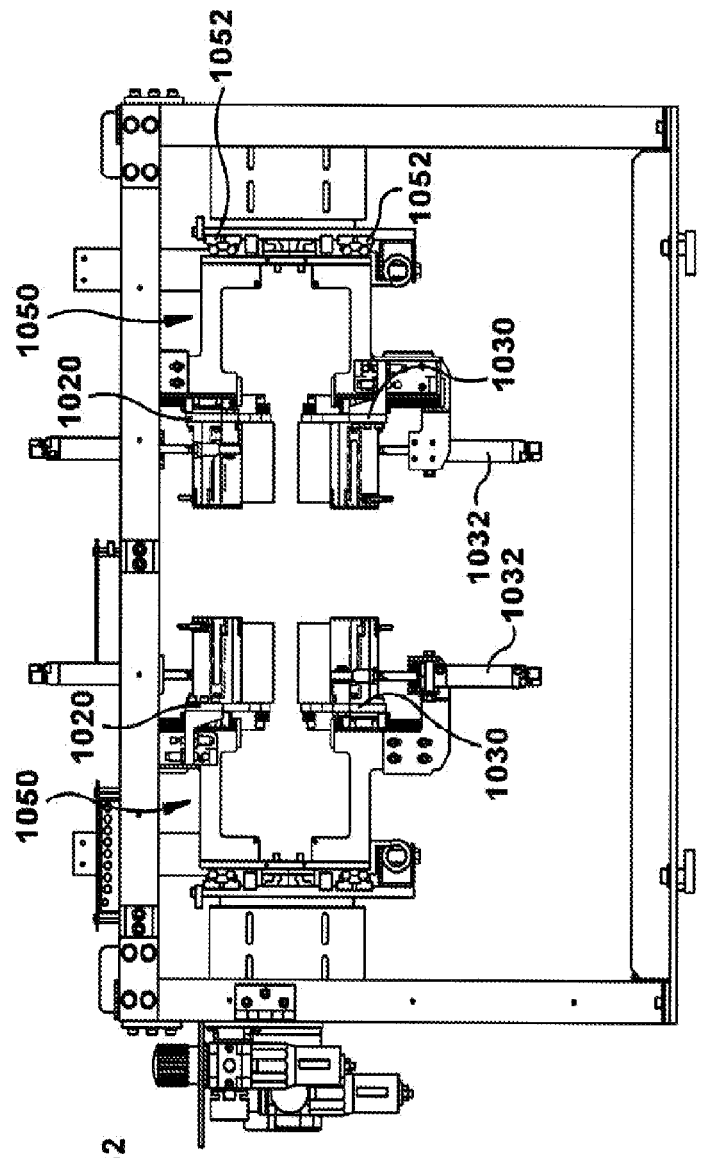
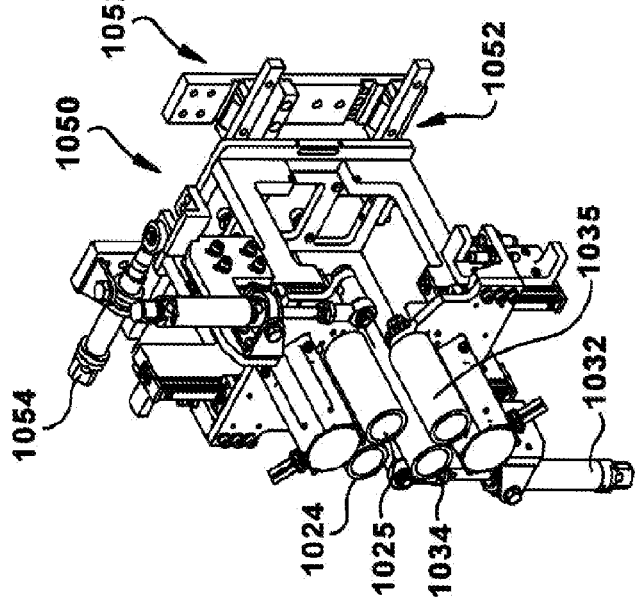
Fig. 16A
Fig. 16B

INNERSPRING MANUFACTURING AND ASSEMBLY SYSTEM AND COMPONENTS FOR SELECTABLE COIL ORIENTATION, POSITION ADJUSTMENT AND COIL CONVEYANCE

RELATED APPLICATIONS

This application is related to U.S. Provisional Patent Application Ser. No. 61/784,196 filed Mar. 14, 2013, the entire disclosure of which is incorporated herein by reference.

DISCLOSURE

The present disclosure and related inventions are in the general field of manufacturing machinery, and more particularly in the field of wire forming, handling and assembling machinery.

BACKGROUND

Wire forming machinery of the type used to manufacture springs and spring assemblies from steel wire, such as innersprings made of interconnected spring coils for use in mattresses and furniture, includes the primary components or an individual coil spring formation machine, also referred to as a "coiler", an individual spring or coil transfer mechanism that removes the springs from the coiler, a conveyor for transporting a series of springs away from the coiler, and an assembler which operates to engage and move a plurality of springs into an array wherein the springs are connected together to form an innerspring assembly. Coilers can be configured to produce different types of generally helical coil bodies having multiple turns of wire with predetermined diameter and pitch, and punch forming stations at each end of the coil body to form different types of ends generally perpendicular to the helical body. The coils are removed from the coder by an arm such as a geneva arm after a final head forming station and annealing station by electrical current. The orientation of the coil is determined by the point at which it is engaged by the geneva arm and any reorientation caused by motion of the arm and work stations prior to delivering the coil to the conveyor.

Newly developed innerspring assemblies, such as those disclosed in commonly owned pending patent applications, have arrangements of interconnected coils which have varying orientations with respect to a longitudinal axis of the coil. For example, the opposing heads on the coils can be identical or non-identical, and even where identical can be 180 degrees out of phase by connection at radially opposite points to the helical coil head or body. These new types of innerspring assemblies require that coils in specified locations of a matrix of coils that make up the innerspring have specific orientations as defined by the radial positions of the coil heads in a common plane of the innerspring. Some newer innerspring manufacturing machinery is capable of producing different patterns of varying spring orientation in an innerspring, but older existing equipment is not.

DESCRIPTION OF DRAWING FIGURES

FIG. 4 is an end view of the coil orientation device of FIG. 1, at the line 4-4 as indicated on FIG. 3;

FIG. 5 is a perspective view of a part of the coil orientation device of FIG. 1

FIG. 12A is a side view of the coil straightening device of FIG. 11;

FIG. 12B is a cross-sectional view of the coil straightening device of FIG. 12A;

FIG. 12C is an end view of the coil straightening device of FIG. 12B;

FIG. 13B is a second perspective view of the coil orientation device of FIG. 13A;

FIG. 13C is a top view of the coil orientation device of FIG. 13A;

FIG. 13D is a side view of the coil orientation device of FIG. 13A;

FIG. 13E is an end view of the coil orientation device of FIG. 13A;

FIG. 16A is a perspective view of the master double frame assembly of FIG. 16A, and FIG. 16B is an elevation of a tandem arrangement of the coil orientation device of FIG. 16A.

SUMMARY OF THE DISCLOSURE AND RELATED INVENTIONS

Figure 1:
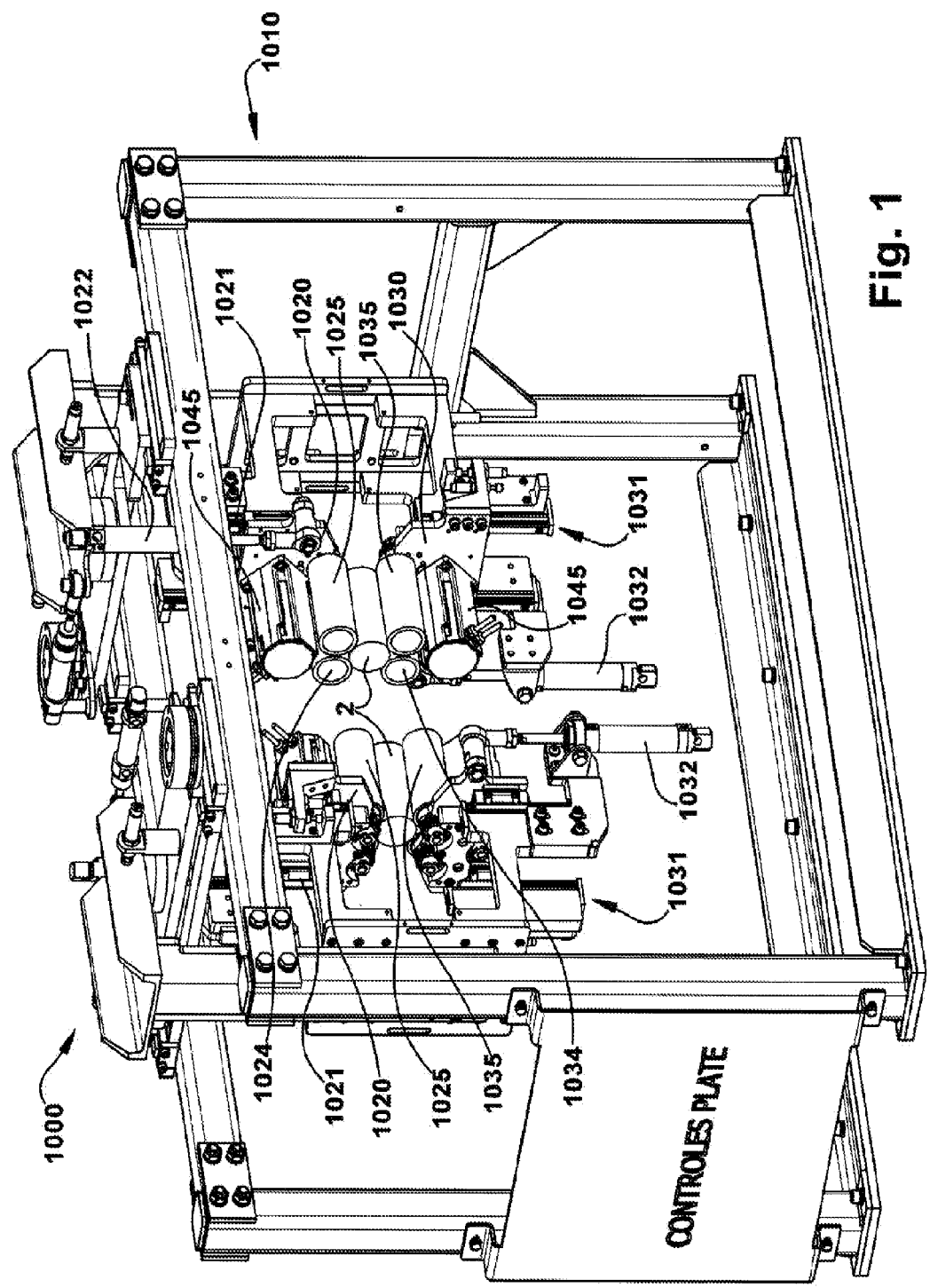
FIG. 1 is a perspective view of an embodiment of a coil orientation device of the present disclosure.

The present disclosure and related inventions provides devices and mechanisms by which coils in an innerspring manufacturing process can be installed in an automated manner in any desired radial orientation about the longitudinal axes of the coils. This coil orientation is referred to herein generally as "radial coil orientation" or "radial orientation".

In accordance with one aspect of the disclosure and related inventions, radial coil orientation is accomplished integral with a coiling machine or as a station in a coiler. In one embodiment, opposing rotatable disks are incorporated into the coiler or provided as an additional station post coil formation. Coils are positioned axially between the disks and held there in position by friction, compression, magnetic force with the disks or combination thereof. For example, the steel of the disks may be magnetized, and/or the surface of the disk coated with friction material. The disks then rotate in synchrony a selected number of degrees to a new radial coil orientation. The coil is then transferred in the new radial coil orientation to a conveyor wherein it remains in that orientation and upon transfer to an assembler and in final assembly.

One embodiment of a coil transfer mechanism operative to transfer coils from the opposing disks to a conveyor is in the form of opposing pairs of reciprocating and translatable arms configured to laterally engage the ends of a coil while it is between the opposing disks. The arms are also referred to herein as "coil transfer arms". Once engaged with the coil, the arms translate in tandem laterally or pivotally to shuttle the coil from the opposing disks into a conveyor. In an embodiment where the conveyor is in the form of opposing belts, the arms deliver the coil in the correct radial orientation into engagement with the belts which then convey the coil into position for transfer to an assembler. The motion of the arms is accomplished by a servo driven offset crank that allows for a significant reduction in the time required to make a displacement move as compared to a conventional cam and offset linkage. The use of a servo motor and drive allows the rate of the coil retrieving cycle to be maximized and precisely controlled, and also allows instantaneous stopping and stepping as required to match other motions of the coiler or conveyor. In a preferred embodiment, there are opposing pairs of arms at each end of the coil. The arms in an extended position engage the coil end in an opposing manner, and then translate or pivot to move the coil linearly to the conveyor. A preferred high-speed mechanism is for the arms to pivot from a first position of initial engagement with a coil to a second position of delivery of the coil to the conveyor. Linear motion of the arms may also be combined with pivoting motion, in the manner of a crank.

In order for the coil transfer arms to interface with the coil conveyor, for example with the conveyor in the form of opposing belts which advance in unison, the belts are preferably driven from a location remote from the coiler and coil transfer arms. In a preferred embodiment, the belts are driven from endpoints, for example by the vertically mounted drive motors illustrated, of the conveyor farthest from the coiler and coil transfer arms and beyond the extent of the assembler with which the conveyor interfaces. By this arrangement the opposite or return ends of the belts are mounted upon rollers located proximate to the coiler and coil transfer arms, as illustrated. Belt tensioners can be provided and employed between the driven and return ends of the conveyor belts.

In another aspect of the present disclosure and related inventions, an alternate embodiment of a coil orientation mechanism works in conjunction with a conveyor, such as the described and depicted opposing belt type conveyor. As shown, coils which are placed directly into the conveyor, without any pre-orientation other than that in which they are removed from the last station of coil formation, are then advanced along the conveyor path toward an assembler. There is conventionally a coil support rail located between the belts and beneath the coils, even though the coils are held by compression between the belts. The coil orientation mechanism of this embodiment is located at a gap in the coil support rail so as to be able to contact the coils from above and below the conveyor path. A cooperating set of four rollers is provided, with upper and lower adjacent pairs mounted on horizontally disposed spindles. The spindles are mounted to a frame which is mounted and actuated for linear movement generally perpendicular to the conveyor path and the longitudinal axes of the coils in the conveyor.

As the individual coils progress by step through coil orientation mechanism, one of the steps is located directly between the upper and lower pairs of rollers. In other words, the longitudinal axis of the coil at that step is located between the spindles of the upper and lower pairs of rollers. Once a coil is in that location, the pairs of rollers are actuated to advance linearly into contact with the coil body, i.e. the helical wire form between the coil ends, the upper and lower pairs of rollers converging to move into such contact with the coil body. The rollers are then simultaneously driven in the appropriate direction and through a pre-determined number of degrees to accomplish rotation of the coil about its longitudinal axis to a desired orientation. The rollers then retract out of contact with the coil and the conveyor advances, moving the newly oriented coil toward an assembler and moving a subsequent coil into position with the coil orientation mechanism. In this manner a series of coils in a conveyor can be selectively oriented prior to delivery to an innerspring assembler. The coil orientation mechanism can of course be programmed to orient coils at any radial point about the longitudinal axis of the coil, and to operate on none, some or all of the coils in a series in the conveyor. For example, for automated assembly of an innerspring in which a first row or column of coils has a first orientation, and a second row or column of coils has a second orientation that is different from the first orientation, the coil orientation mechanism is programmed accordingly to operate only on the coils designated for a row or column which require a change in orientation while in the conveyor, i.e. prior to delivery to an assembler. Also, alternating orientations of coils within individual rows or columns, in any sequence or series or sets, can be accomplished by commanding the coil orientation mechanism to operate on only selected coils.

DETAILED DESCRIPTION OF PREFERRED AND ALTERNATE EMBODIMENTS

Figure 8:
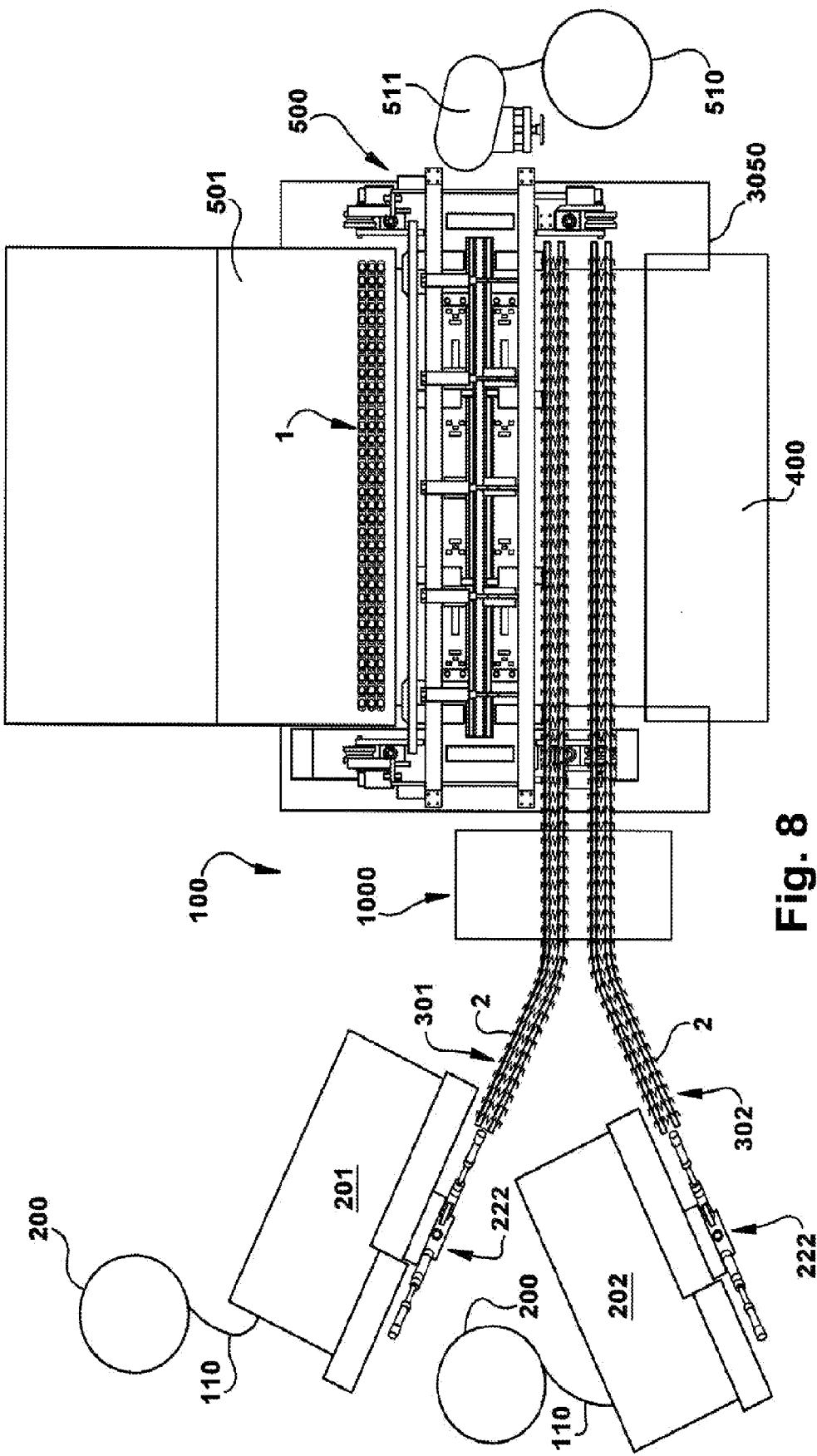
FIG. 8 is a schematic plan view of an innerspring manufacturing and assembly system of the present disclosure.

As shown in FIG. 8, in a schematic of a representative arrangement of an innerspring manufacturing and assembly system, indicated generally at 100, a coil orientation device or devices, indicated generally at 1000, is preferably located between one or more coil formation machines, indicated at 201 and 202, which form individual coils 2 which are transferred by conveyors 301, 302 to a coil transfer machine 400 which operates to transfer a complete or partial row of coils 2 into an innerspring assembling machine or "innerspring assembler", indicated generally at 500, which engages two or more rows of coils for interconnection of the coils, for example by a transversely extending helical lacing wire generated from a lacing unit 511 which interlaces adjacent or tangential rows of coils. As used herein, the term "innerspring assembler" refers to and includes the machinery and mechanisms which remove coils from the coil conveyor and which interconnect the coils by lacing wire or other means to form an innerspring.

Figure 9:
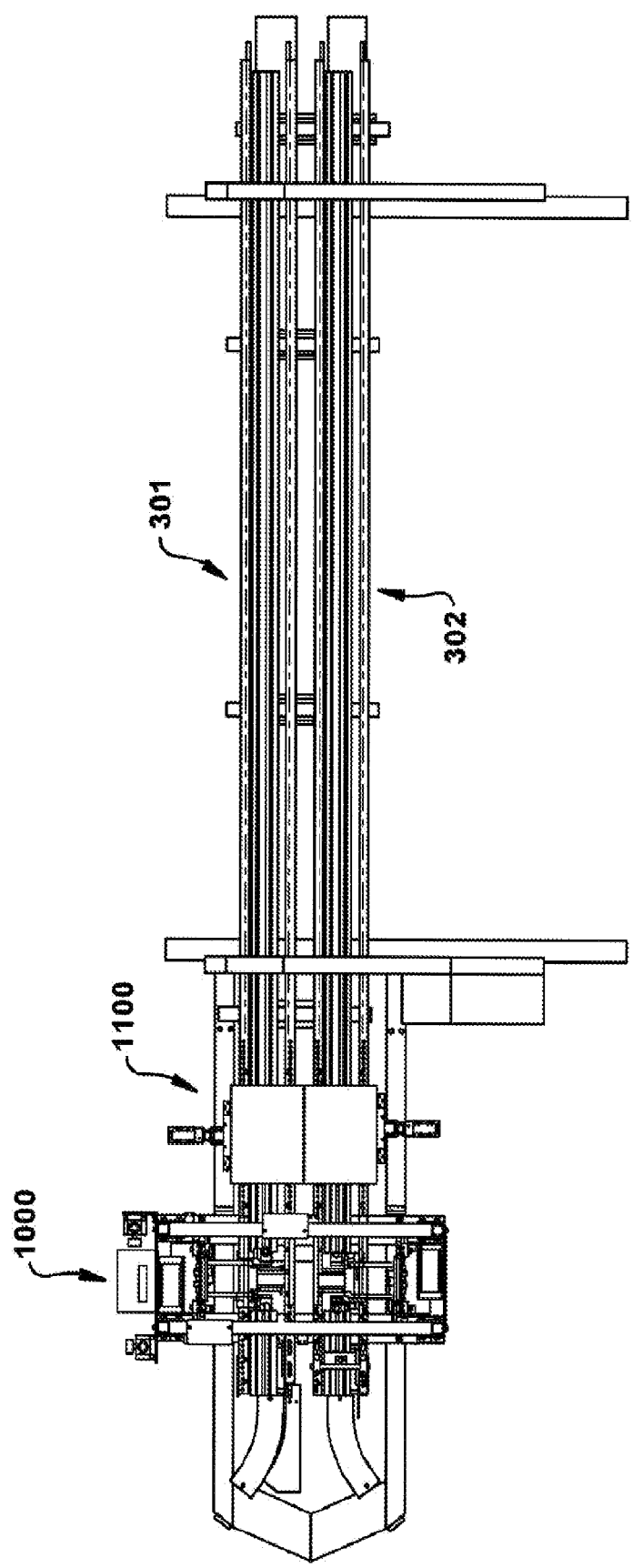
FIG. 9 is a schematic plan view of a section of a conveyor, and coil orientation and coil straightening components of an innerspring manufacturing and assembly system of the present disclosure.
Figure 10:
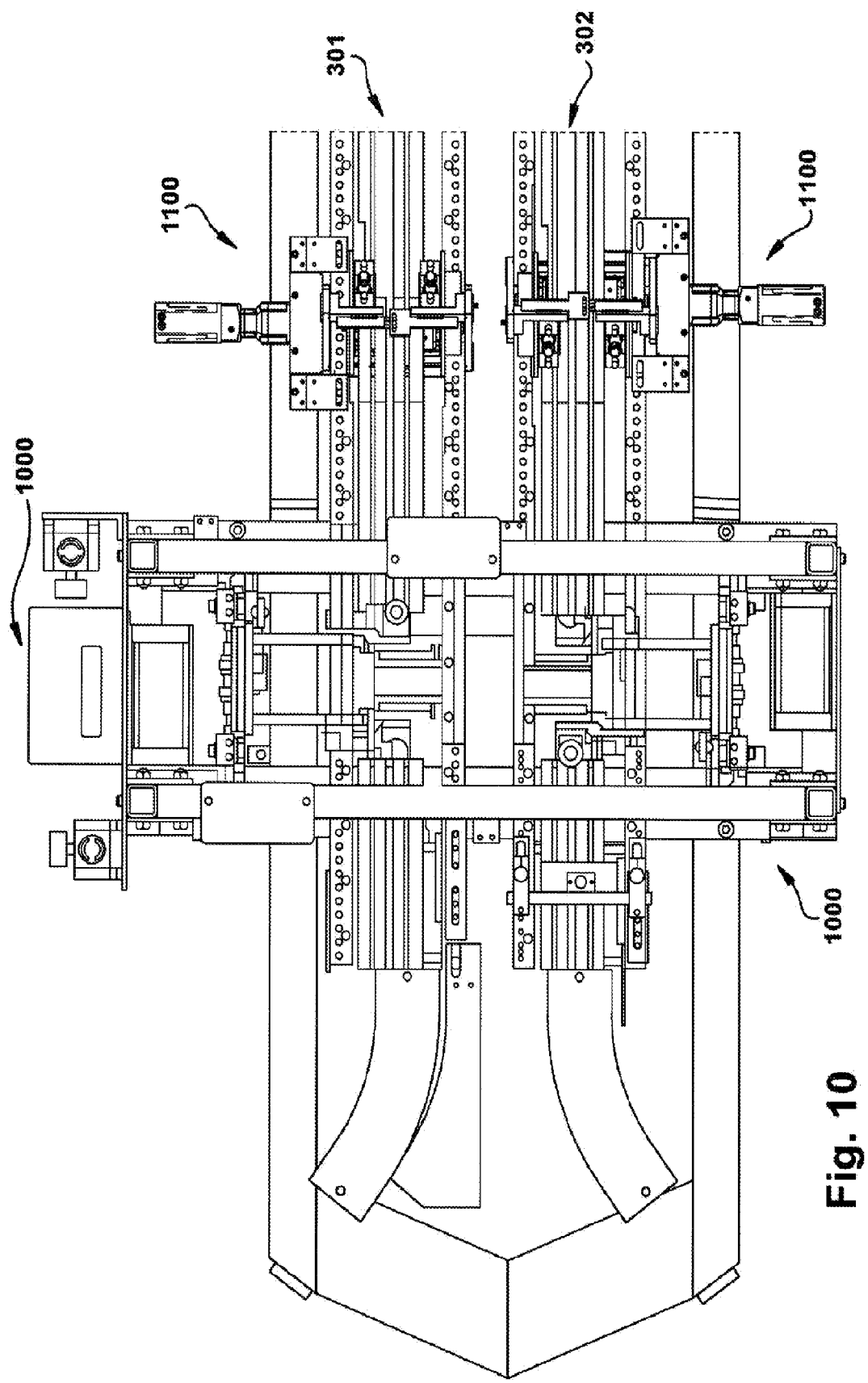
FIG. 10 is a schematic plan view of a section of a conveyor, and coil orientation and coil straightening components of an innerspring manufacturing and assembly system of the present disclosure.
Figure 11:
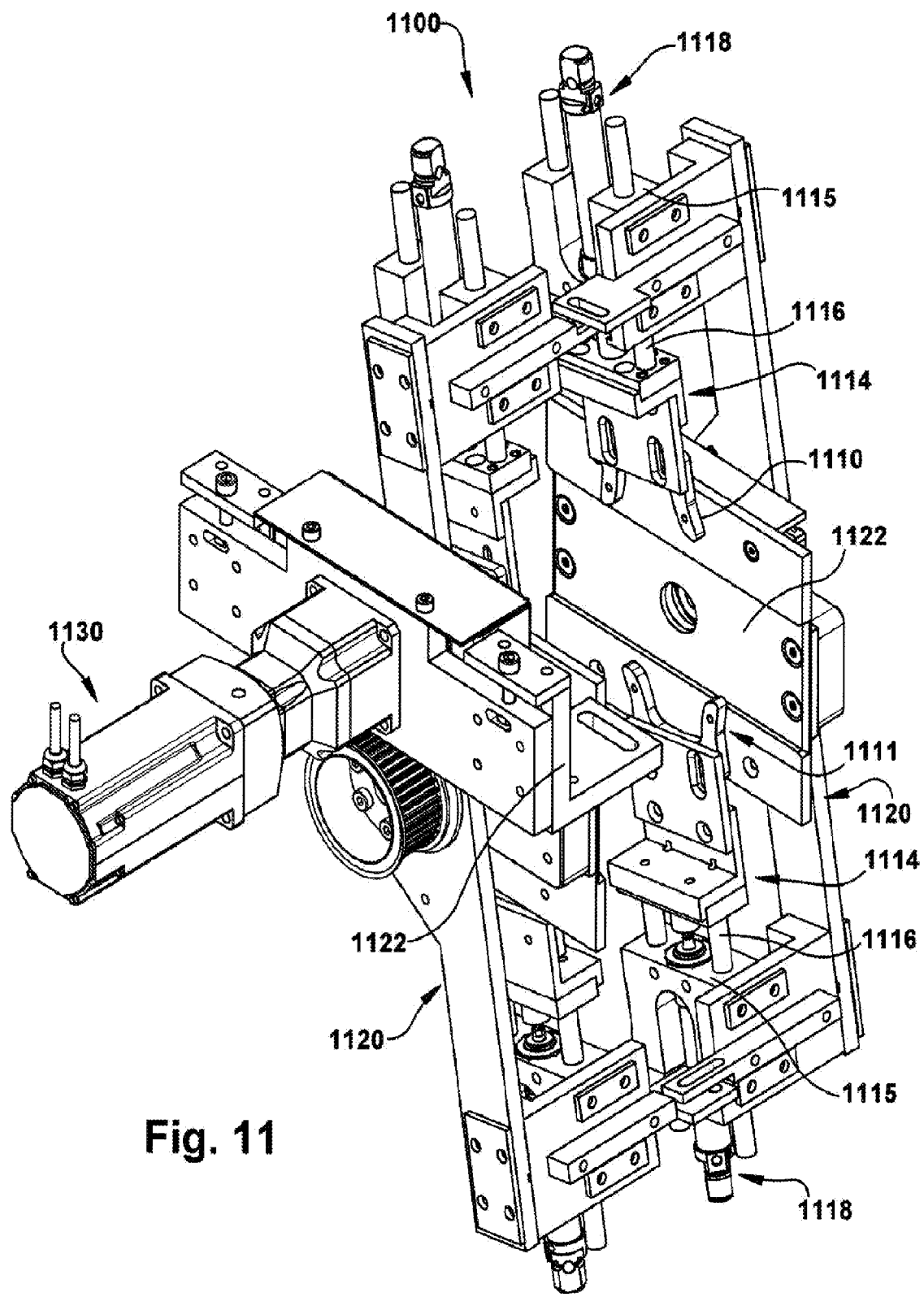
FIG. 11 is a perspective view of a coil straightening device of the present disclosure.
Figure 13A:
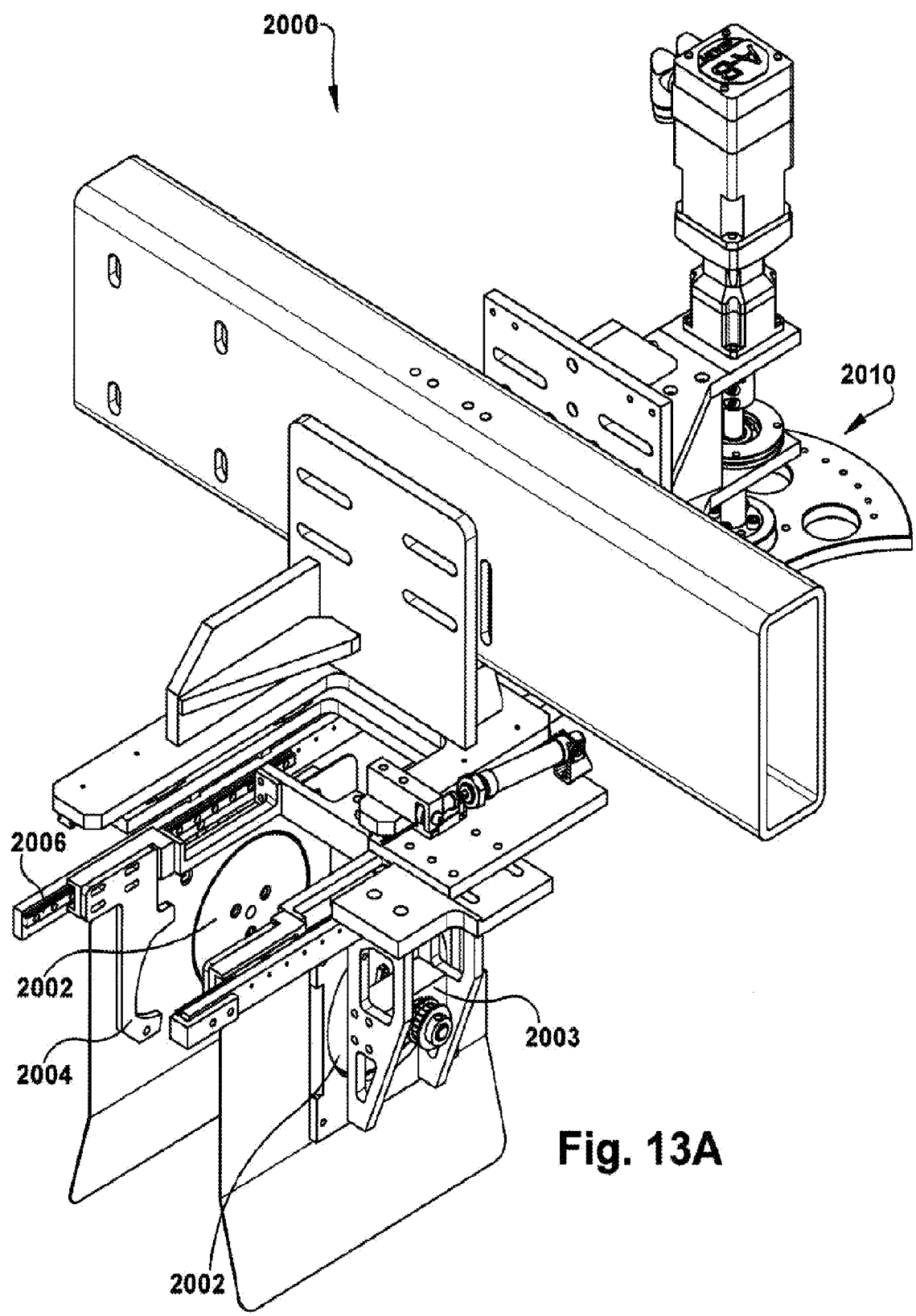
FIG. 13A is a first perspective view of an alternate embodiment of a coil orientation device of the present disclosure.

FIGS. 9 and 10 illustrate an alternate embodiment of described components of an innerspring manufacturing and assembly system including conveyors 301, 302, coil orientation device 1000, and a coil straightening device or devices indicated generally at 1100, located for example in relation to the conveyors 301, 302 and between the coil orientation device 1000 and the location of the coil transfer machine 400 and innerspring assembler 500 as shown in FIG. 8, and as further described.

As shown in FIGS. 8-10, the coil orientation device 1000 is positioned to straddle or traverse conveyors 301, 302 preferably at a location where the conveyors are straight and parallel as illustrated, and generally proximate or closely proximate to the coil transfer machine 400. A single or unified support structure or frame 1010 can be configured to straddle the two conveyors 301, 302 and support two separate coil orientation devices 1000, as further described.

FIGS. 1-7 illustrate a first embodiment of a coil orientation device, indicated generally at 1000, which can be implemented as a component of innerspring manufacturing machinery as just described in order to radially orient coils 2 within one or both conveyors 301, 302. The coil orientation device 1000 is positioned to mechanically interface with one or both of the coil conveyors 301, 302 and more specifically to traverse one or both coil conveyors 301, 302 in order to operate on coils 2 in the conveyor, as further described. Accordingly, the coil orientation device 1000 is preferably located between the coil formation device or devices 201, 202 and the coil transfer machine 400, as shown in FIG. 8, although the exact location may vary.

Each coil orientation device 1000 has upper and lower carriages 1020 and 1030, each of which are mounted on racks 1021, 1031 for vertically oriented linear translation, for example by actuators 1022, 1032 toward and away from the corresponding conveyor. A first pair of rollers 1024, 1025 is mounted upon carriage 1020 to extend generally perpendicularly therefrom and cantilevered over the corresponding conveyor. The axis of the rollers 1024, 1025 are preferably closely spaced for minimal clearance between the outer diameters of each roller (for example less than the diameter of a coil body), however the lateral spacing of the rollers 1024, 1025 may be varied. Also, although in this particular embodiment the rollers are arranged side-by-side, one roller may be mounted slightly higher or lower than the other.

A second pair of rollers 1034, 1035 are similarly mounted upon carriage 1030 and generally vertically aligned with and below rollers 1024, 1025. Each pair of rollers 1024-1025 and 1034-1035 is selectively and cooperatively driven for rotation, for example by motors 1045, to work in common effort to impart rotation in a desired direction to a coil in tangential contact with the outer diameter surfaces of the rollers. The rollers are rotationally driven, for example, by suitable PLC-controlled servo motors, chain, gear or belt drive for clockwise or counter-clockwise rotation through a specified number of degrees per cycle. The direction of rotation may be fixed for a particular manufacturing set-up, or alternate in any desired sequence or pattern. For example, each coil in a series may be turned the same or alternating number of degrees, or every n coil in a series turned, or the direction of rotation alternated. Operationally, the rollers 1024-1025 and 1034-1035 are held in close proximity to a coil 2 that is advanced into position between the rollers by the conveyor 301 or 302. When a coil is centered between rollers 1024-1025 and 1034-1035, the carriages 1020 and 1030 are actuated to advance the rollers into tangential contact with the coil. The roller drives are then driven to rotate, imparting rotation to the coil by frictional contact through the specified number of degrees. The surfaces of the rollers 1024-1025 and 1034-1035 are preferably a high friction surface, such as knurled, or coated with carbide, diamond, polymeric or other high-friction material or surface treatment. The coil is free to rotate within the conveyor while under partial compression between the opposing belts of the conveyor. Once a coil is oriented as desired within the conveyor, the upper and lower carriages 1020, 1030 retract, allowing the coil to advance and a subsequent coil to be moved into position between the rollers.

Figure 7:
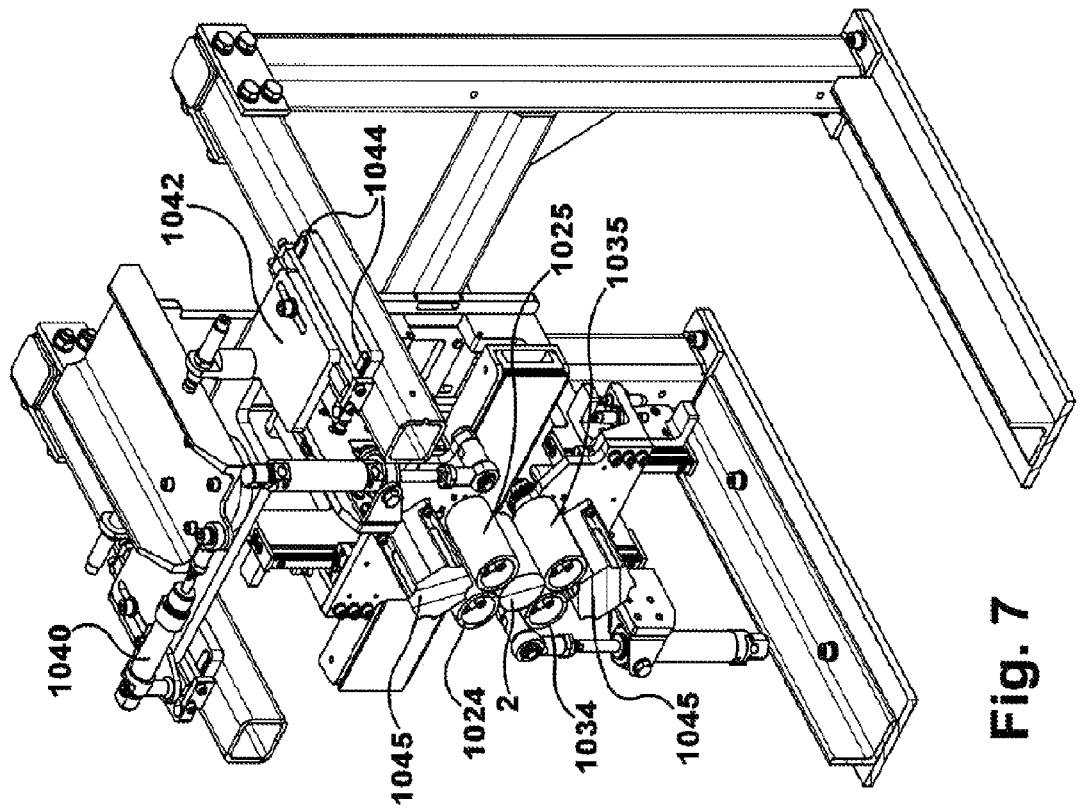
FIG. 7 is a perspective view of a part of the coil orientation device of FIG. 1.
Figure 6:
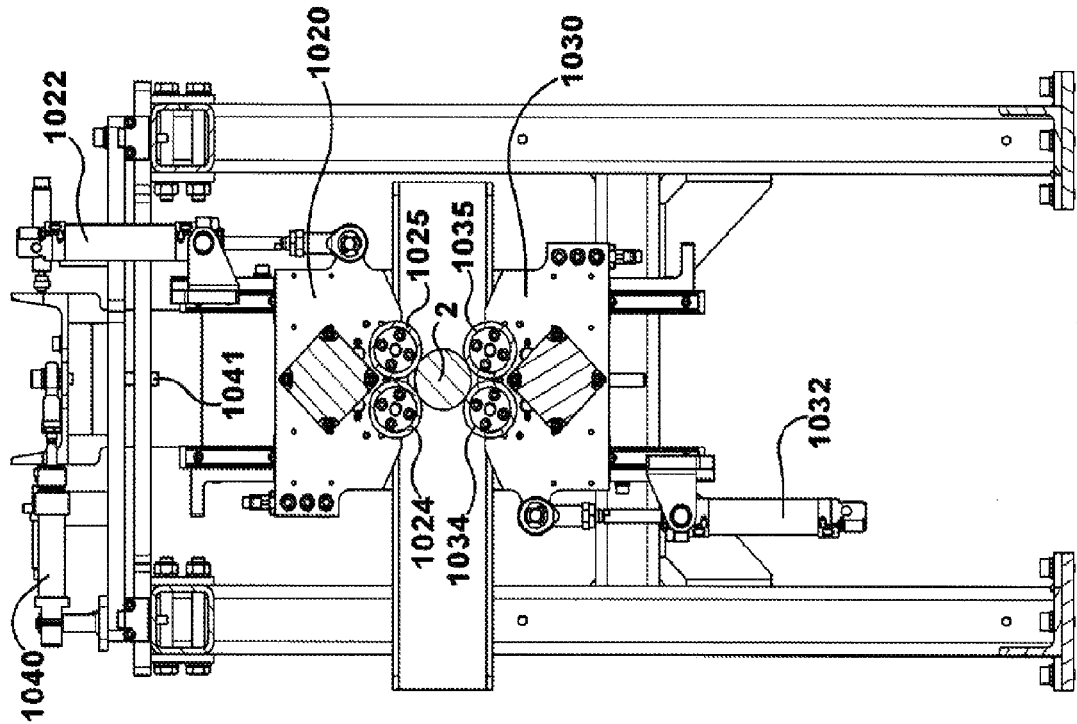
FIG. 6 is a partial cross-sectional elevation of a part of the coil orientation device of FIG. 1 at the line 6-6 as indicated on FIG. 3.

The device 1000 further includes mechanism for lateral adjustment of the coil within the conveyor and while in contact with the rollers 1024-1025 and 1034-1035. As shown in FIGS. 6 and 7, the carriages 1020, 1030 may be displaced laterally or pivotally by actuator 1040 which displaces the carriages, for example about pivot 1041 within guide slots 1044. When implemented in this manner for example in connection with the upper rollers 1024-1025, a final adjustment of the position and axial alignment of the coil within the conveyor can be performed just prior to retraction of the rollers 10244025 and 1034-1035 and subsequent conveyance of the coil beyond the orientation device 1000.

An alternate embodiment of a laterally displaceable coil orientation device 1000 is illustrated in FIGS. 16A and 16B. A master double frame assembly 1050 supports the upper and lower carriages 1020, 1030, and is mounted upon horizontally disposed upper and lower tracks 1052 for lateral translation thereon, for example by actuator 1054. By this arrangement all four rollers 1024-1025 and 1034-1035 can be shifted laterally in either direction in unison while in contact with a coil in the conveyor.

Figure 2:
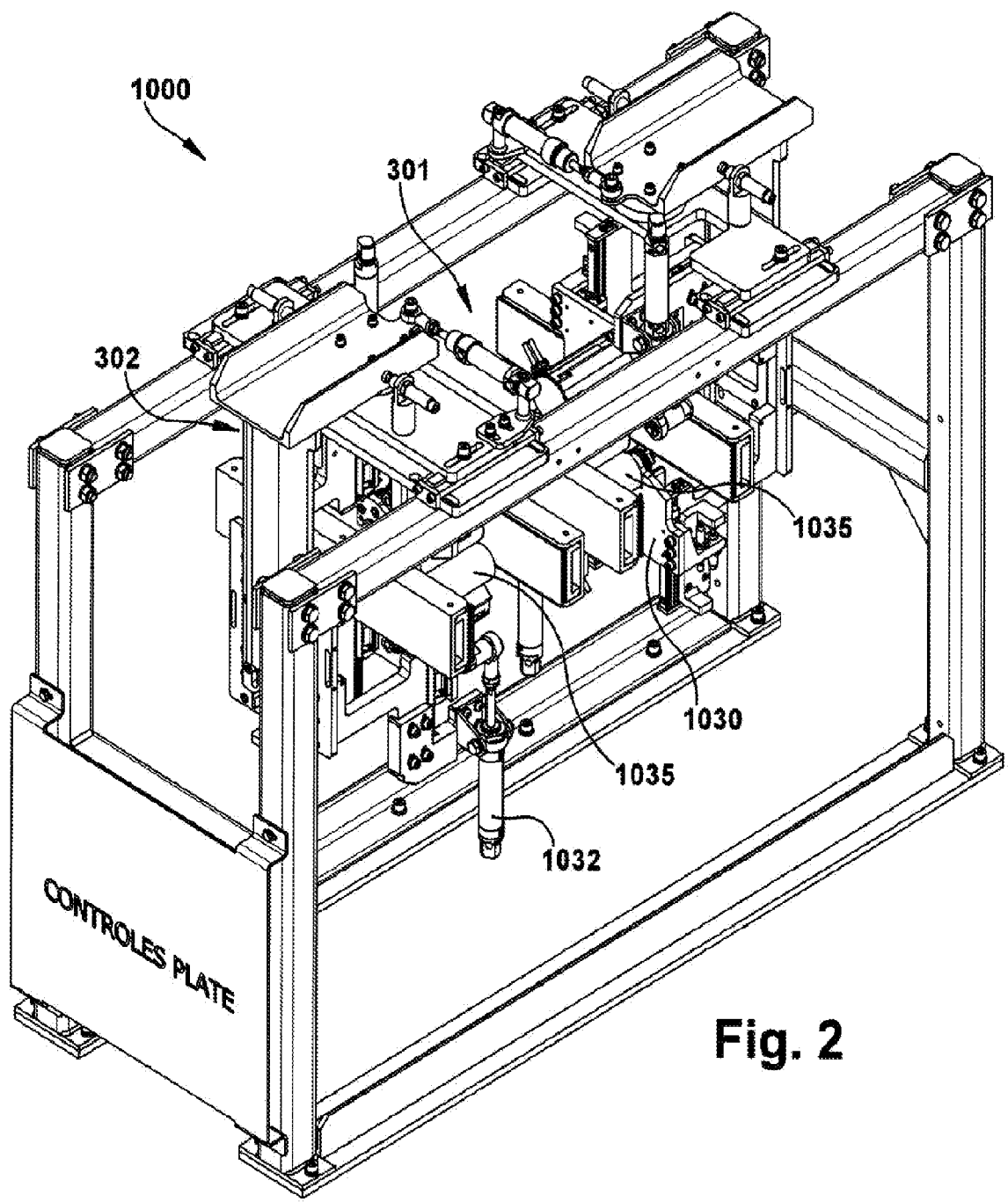
FIG. 2 is a top view of the coil orientation device of FIG. 1.
Figure 3:
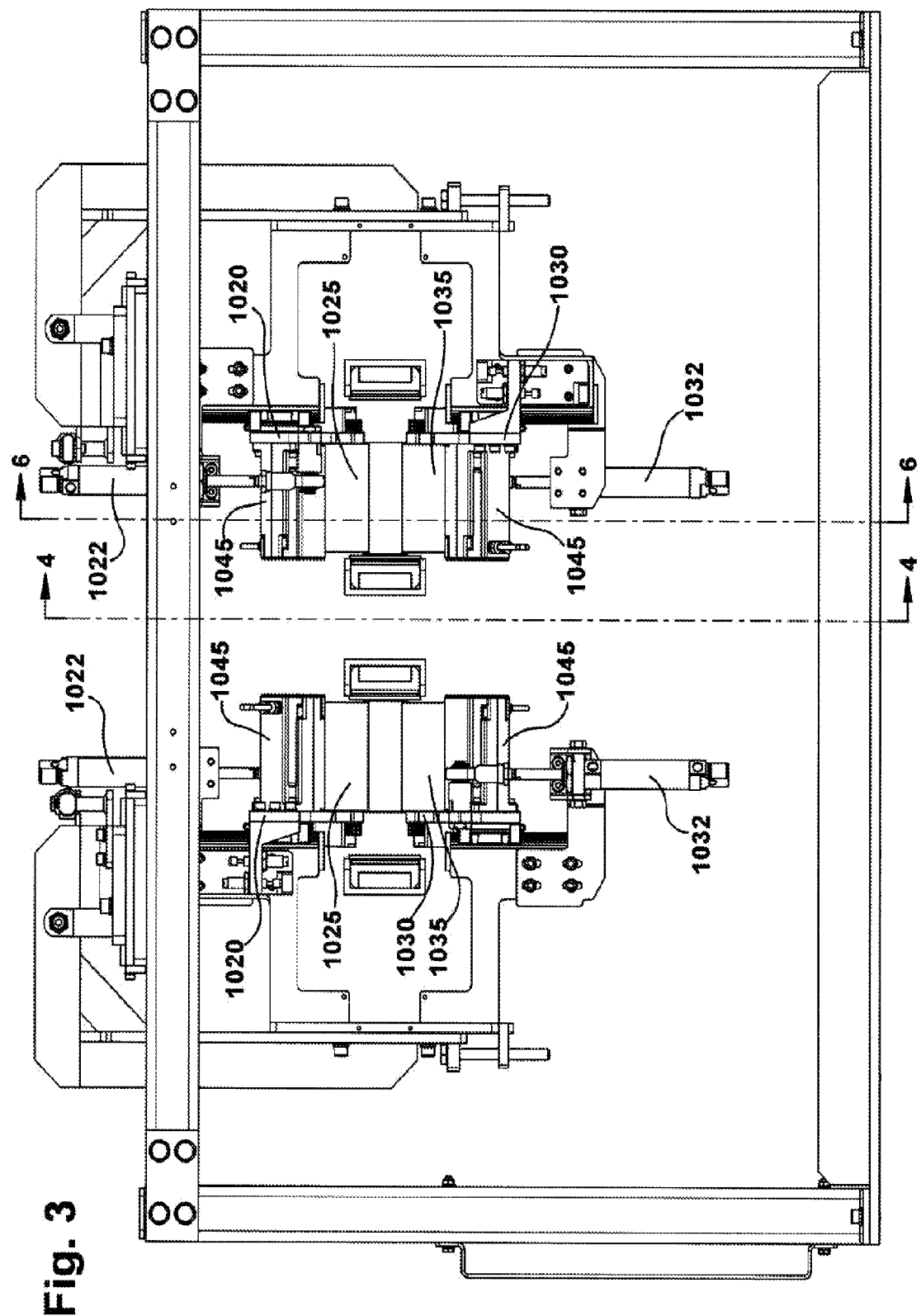
FIG. 3 is an end view of the coil orientation device of FIG. 1.

When arranged in tandem as shown in FIGS. 1-3, the coil orientation devices 1000 may by operated in synchrony or asynchrony, and timed with the rate of the stop/motion cycle of the corresponding conveyor. Alternatively, either coil orientation device 1000 may be operated singly with a corresponding single operating conveyor.

As further shown in FIGS. 9 and 10, proximate to each of the coil orientation devices 1000 and downstream on the conveyor path toward the innerspring assembler are coil straightening devices 1100 (or "coil straighteners" as used herein refers to the device or devices 1000, as described). As further illustrated in isolation in FIGS. 11, 12A, 12B and 12C, each coil straightener 1100 has opposing pairs of yokes 1110 and 1111 which are generally configured to engage with a coil end of any particular form such as offset, circular or other shape. Each yoke 1110, 1111 is mounted to a base 1114 which is attached to slides 1116 which are slidably mounted in guide blocks 1115. The base 1114 is also attached to a linear actuator 1118. The linear actuator 1118 is connected to a drive source (not illustrated) such as solenoid or pneumatically operated plunger for powered linear reciprocating motion of the base 1114 and yoke 1110, 1111. Each guide block 1115 is attached to or otherwise in contact with an oscillator arm 1120 for oscillation of the yoke pairs about axis A. With the yokes 1110, 1111 actuated into engagement with the ends of a coil, the oscillator arms 1120 are driven by drive system 1130 to rotate the yokes (and attached components) and the coil engaged therewith through a specified number of degrees about the coil axis as the coil remains in the conveyor, i.e. between the coil belts which pass inside of the bearing plates 1122.

The coil straighteners 1100 can be used alone or in combination with the coil orientation devices 1000, and in connection with one or both conveyors 301, 302. Also advantageously the coil straighteners 1100 can be programmed and controlled to add to or subtract from the degrees of orientation of a coil as received from the coil orientation device 1000 or directly from the coil forming machinery.

FIGS. 13A-13E illustrate an alternate embodiment of a coil orientation device, indicated generally at 2000, which can be substituted for the previously described coil orientation device 1000 in an innerspring manufacturing and assembly system 100 as shown in FIG. 8, and located proximate to a coil former and a coil conveyor. The coil orientation device 2000 has a pair of opposed disks 2002 situated in guides 2014 and spaced to receive a coil therebetween with an axis of the coil perpendicular to the surfaces of the disks, and each coil end bearing against a disk surface, for example in a slightly compressed state. Coils can be installed into this position between the disks 2002 in an automated manner by operation of a geneva 222 which carries coils from a coil source, such as the coil formers 201, 202 shown in FIG. 8, or from pre-formed stock, inserts a coil into position between the disks 2002 and then releases it. With a coil thus positioned, the disks are driven to rotate by a disk drive 2003 through a controlled number of degrees to change the orientation of the coil about its axis. So oriented and preferably maintained in the radial orientation determined by the rotation of the disks 2002, the coil is then transferred to a conveyor by transfer arms 2004 which act on the coil ends and translate along tracks 2006 in a direction perpendicular to the coil axis to a receiving end or point of a conveyor, such as conveyor end 3005 shown in FIG. 14, and return for engagement with a subsequently delivered coil.

A high rate linear reciprocating motion mechanism for actuation of the arms 2004 is provided by a servo-driven offset crank or cam 2010 connected by linkage 2012 to slides 2006 to which the arms 2004 are connected. Timed rotation of the battle axe cam 2010 by rotary drive 2011 actuates a complete coil transfer cycle of the arms 2004 from the location of the disks 2002 to the conveyor in synchronization with release of the coil and delivery of a subsequent coil between the disks 2002 by the geneva 222. The servo-driven offset crank configuration allows for a reduction in the time required to complete the displacement cycle of the coil transfer arms 2004, and enables control of the cycle time and completion, and instantaneous stopping or stepping to synchronize with coil former, geneva and conveyor operations.

Figure 14:
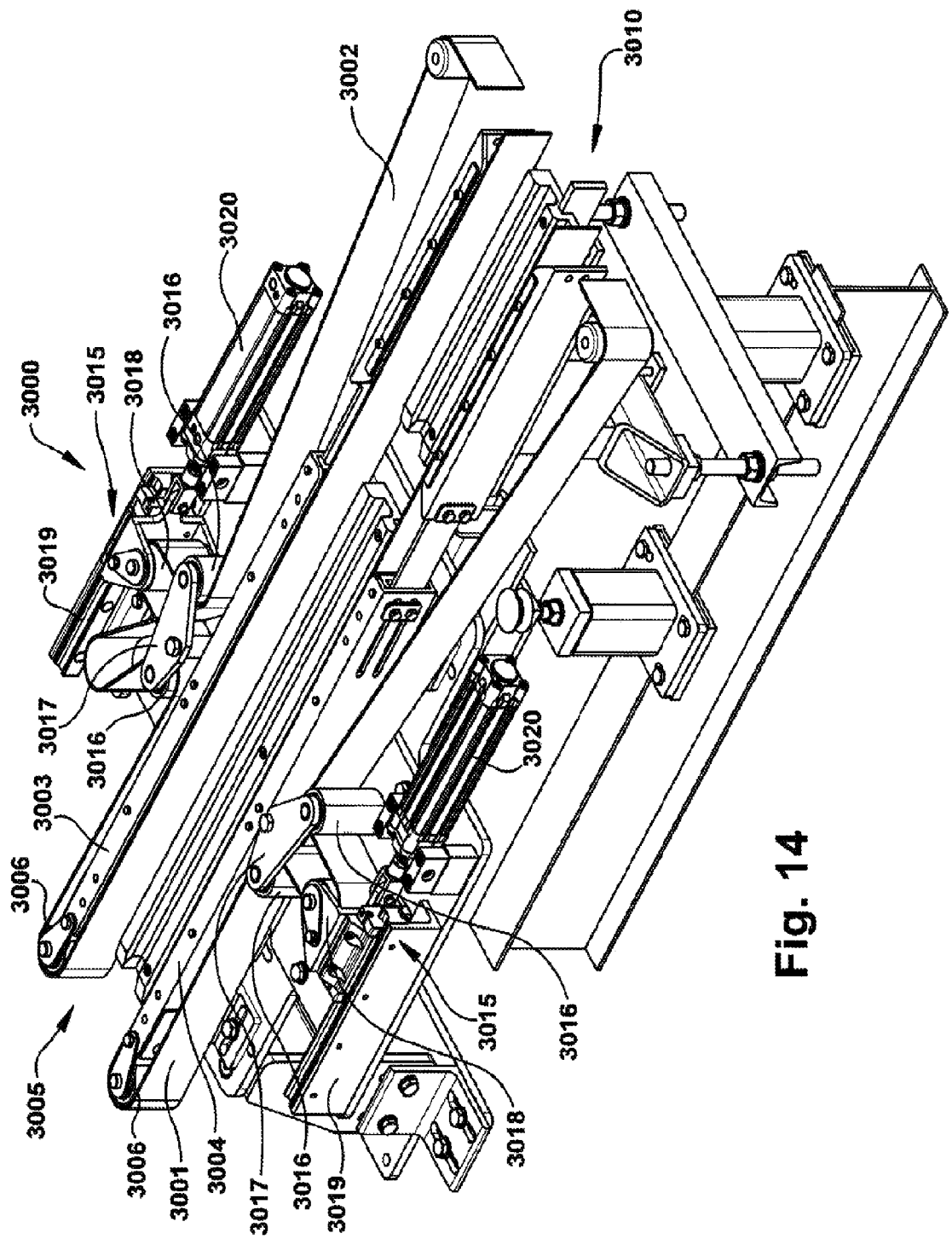
FIG. 14 is a perspective view of an entry and belt adjustment portion of a coil conveyor of the present disclosure.

FIG. 14 illustrates an alternate embodiment of a conveyor or part of a conveyor, generally indicated at 3000, which is specially configured for implementation in connection with the described innerspring manufacturing and assembly system 100 of FIG. 8, and more particularly configured as the entry end of a conveyor, and as a conveyor belt adjustment or tensioning mechanism, as further described. Opposed conveyor belts 3001, 3002 are mounted upon guides 3003, 3004 which define a primary conveyor path therebetween. Conveyor end 3005 is defined by return rollers 3006 about which each belt runs. Conveyor end 3005 is configured to interface directly with geneva 222 (FIG. 8), and with either of the described coil orientation devices 1000 or 2000, for example as the point or area of entry and transfer of coils from the geneva 222 to the conveyor. The overall length or extent of the conveyor 3000, as for example from end 3005 to end 3010, can be designed to any particular dimensions to properly interface with any of the described downstream components including but not limited to coil orientation, coil straightening and coil transfer devices. One or both of the conveyor belts 3001, 3002 is threaded through and follows a path through a tension adjustment circuit indicated generally at 3015 which includes divert rollers 3016 mounted on a bogey frame 3017, and a slide roller 3018 which is mounted for lateral translation along slides 3019 and positioned adjusted by linear actuators 3020. By adjustment of the location of the slide roller 3018 along slides 3019 the tension of the belts 3001, 3002 can be adjusted to accommodate coils of different lengths and spring rates or for any other operational purposes.

Figure 15:
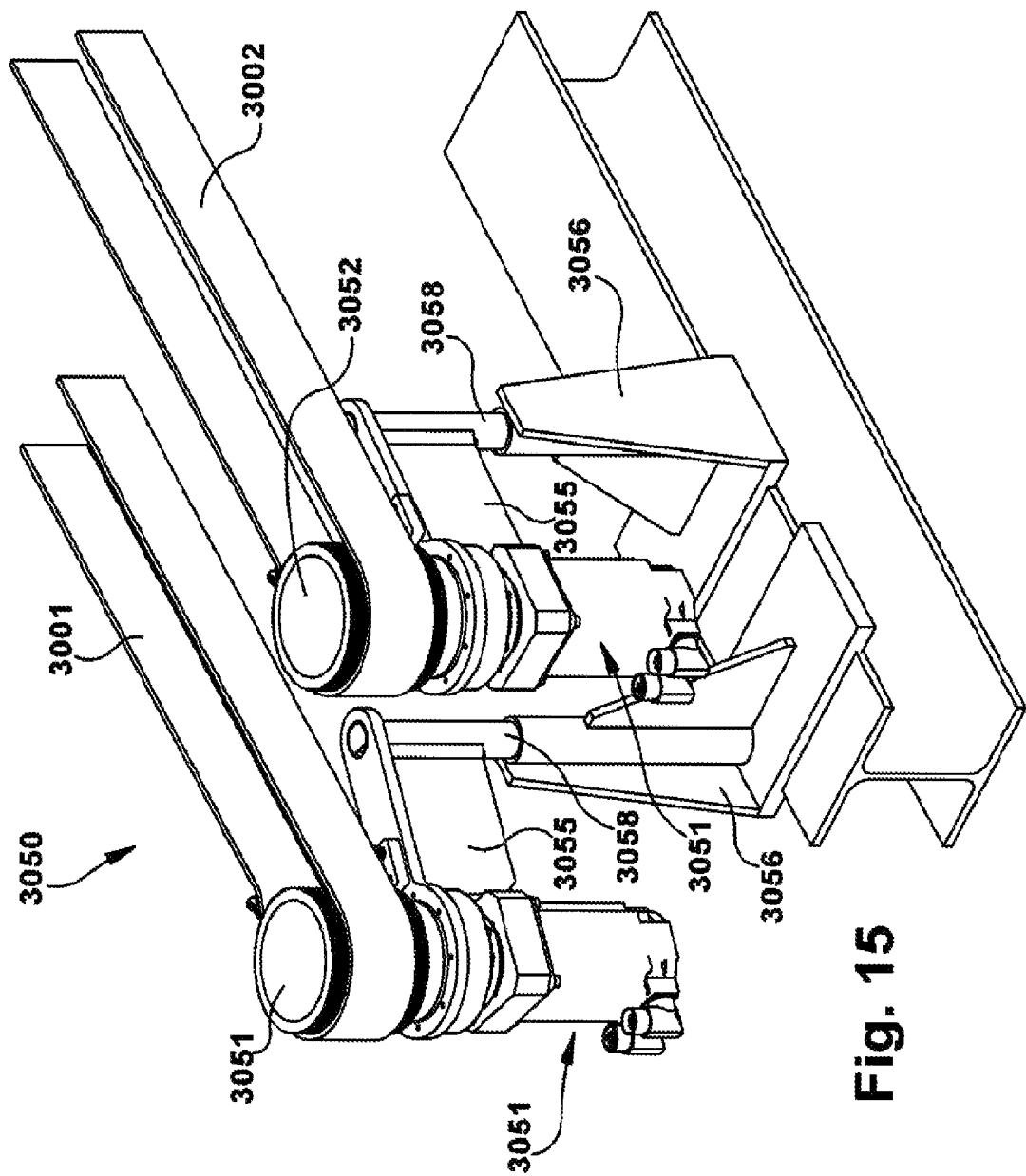
FIG. 15 is a perspective view of a drive portion of a coil conveyor of the present disclosure.

FIG. 15 illustrates a conveyor drive system, indicated generally at 3050, which can be implemented as the drive for either or both conveyors 301, 302, includes vertically mounted conveyor drive motors 3051 for powered rotation of corresponding conveyor belt drive wheels 3052 about which conveyor belts 3001, 3002 travel as shown. The conveyor drive motors 3051 are mounted upon arms 3055 which extend from a vertically oriented mount 3056, including a post 3058 which can be radially adjusted to change the location of the drive hubs 3052 and the trajectories of the conveyor belts 3001, 3002. The conveyor drive system or systems 3050 are preferably located at or near a terminal end of each of the conveyors 301, 302, generally at an opposite end of the belt paths from the receiving end 3005 of the conveyor, as indicated on FIGS. 8 and 14. For example, the conveyor drive systems 3050 for one or both conveyors 301, 302 may be located as indicated schematically proximate to the coil transfer device 400 and/or innerspring assembler 500, for example on a side thereof opposite to the locations of the coil formers 201, 202 and coil orientation device 1000, and generally opposite to the coil entry end 3005 of the conveyors 301, 302 shown in FIG. 14, proximate to the coil formers 201, 202. This general location of the coil drive systems 3050 removed or spaced from the coil formers 201, 202 and coil orientation devices 1000 or 2000 creates additional space for those components of the system 100 and improves adaptability of the conveyors 301, 302 to interface with any of the described alternate embodiments of the system 100. In FIG. 15 the drive motors 3051 are illustrated in a position generally below the belts 3001, 3002 and the drive hubs 3052. Alternatively, the drive motors 3051 and the corresponding support structures may be arranged with the drive motors 3051 located above the belts 3001, 3002 and the drive hubs 3052.

What is claimed is:

1. A coil orientation device comprising first and second pairs of rollers, each pair of rollers mounted for linear translation toward and away from a coil conveyor and into contact with a coil in contact with the coil conveyor,
the first or second pair of rollers driven to rotate while in contact with the coil in contact with the conveyor to rotate the coil about a longitudinal axis of the coil,
wherein the first pair of rollers is mounted above the coil conveyor, and the second pair of rollers is mounted below the coil conveyor.

2. The coil orientation device of claim 1 wherein the first and second pairs of rollers are mounted with axes generally perpendicular to a segment of the coil conveyor.

3. The coil orientation device of claim 1 wherein axes of the first and second pairs of rollers are generally parallel with the longitudinal axes of coils on the coil conveyor.

4. The coil orientation device of claim 1 wherein the first and second pairs of rollers are selectively controllable for linear translation toward and away from a coil conveyor in synchrony with motion of the conveyor.

5. The coil orientation device of claim 1 wherein the first and second pairs of rollers are selectively controllable for rotation of a coil in the coil conveyor through a specified number of degrees.

6. The coil orientation device of claim 1 wherein the first and second pairs of rollers are mounted upon carriages mounted for linear translation toward and away from the coil conveyor.

7. The coil orientation device of claim 1 located proximate to the coil conveyor and at a location along a path of the conveyor that extends from a coil forming machine to an innerspring assembler.

8. The coil orientation device of claim 1 further comprising a lateral adjustment mechanism operatively connected to the carriages of the first or second pairs of rollers.

9. The coil orientation device of claim 1 comprising a drive operatively connected to each pair of rollers.

10. The coil orientation device of claim 1 configured for lateral or pivoting motion relative to a path of the conveyor.

11. The coil orientation device of claim 1 wherein the coil conveyor comprises a pair of opposed generally planar vertically oriented and spaced apart belts for receiving coils axially therebetween, and the first and second pairs of rollers are generally located between the spaced apart belts.

* * * * *